UNITED STATES PATENT OFFICE.

WILLIAM J. KEE, JR., OF KANSAS CITY, KANSAS, AND UTLEY WEDGE, OF ARDMORE, PENNSYLVANIA.

MANUFACTURE OF SULFURIC ACID.

1,220,752.   Specification of Letters Patent.   Patented Mar. 27, 1917.

No Drawing.   Application filed August 8, 1914.   Serial No. 855,809.

*To all whom it may concern:*

Be it known that we, WILLIAM J. KEE, Jr., a citizen of the United States, residing in Kansas City, Kansas, and UTLEY WEDGE, a citizen of the United States, residing in Ardmore, Pennsylvania, have invented certain Improvements in the Manufacture of Sulfuric Acid, of which the following is a specification.

The object of our invention is to expedite the conversion of sulfur dioxid ($SO_2$) into sulfuric anhydrid ($SO_3$) or sulfuric acid ($H_2SO_4$), an object which we attain in the manner hereinafter set forth.

Our invention is applicable especially to the process wherein sulfur dioxid gas derived from burners of sulfur, pyrites, or the like, is passed through a Glover tower, and therein brought into contact with nitrous vitriol (nitroso-sulfuric acid), nitric acid, or nitrous gas produced by the generation of nitric acid from nitrate of soda burned with sulfuric acid, or all of these, so that it leaves the Glover tower mixed with nitrous compounds, and thence passes to chambers or towers where steam is added and sulfuric acid is precipitated, the remaining gas, largely freed from sulfur compounds but containing nitrous gases, oxygen, and nitrogen, then passing to one or more Gay-Lussac towers in which the nitrous gases are mostly absorbed by being brought in contact with strong cold sulfuric acid. The residual gas, largely nitrogen with a little oxygen, escapes into the atmosphere and the nitrous compounds which have been absorbed in sulfuric acid in the Gay Lussac towers are then carried in solution to the Glover tower to be again set free in the continued operation of the process.

In carrying out our invention we subject the gas leaving the Glover tower (consisting of a mixture of sulfur dioxid, oxygen, nitrogen and nitrous gases) to the action of an electric discharge, preferably in the form of one or more electric arcs. To accomplish this we pass the gaseous mixture in whole or in part, first through a flue or chamber in which the electric discharge is maintained and by preference project said mixture directly into contact with said electric discharge, the effect of this operation being to cause a fixation of nitrogen, in chemical combination with oxygen, the conversion of low oxids of nitrogen to higher oxids of nitrogen, and the combination of oxygen atoms to form ozone ($O_3$). The ozone thus formed reacts vigorously with the sulfur dioxid, producing sulfur trioxid ($SO_3$). The higher oxids of nitrogen likewise react with the sulfur dioxid present to oxidize same and the temperature locally produced by the electric arcs further hastens reoxidation of lower oxids of nitrogen previously reduced by contact with sulfur dioxid ($SO_2$). As a result of the above reactions the formation of sulfuric acid ($H_2SO_4$) in the presence of steam from the Glover tower, or steam introduced into chambers or other appliances subsequent to the Glover tower, is more rapidly effected than in the ordinary process and the production of sulfuric acid is increased with a material reduction in the consumption of nitric acid or nitrate of soda used to maintain the oxidizing condition, or, in some cases, without the consumption of any nitrate of soda or nitric acid.

It is evident that the above reactions in whole or in part can be produced in other portions of the sulfuric acid apparatus, as, for example, the gas coming from pyrites or sulfur burners, could be at once subjected to the electric discharge, but the conditions at this point, unless the gases were previously cooled, would not be as favorable for accomplishing the desired result as where the gases would be treated as first described, because the temperature of the gas coming directly from pyrites or sulfur burners would be high enough to retard or prevent the production of ozone by an electric discharge, and the compounds of nitrogen and oxygen formed at the high temperature locally produced by electric arcs would be more liable to disassociate before yielding up oxygen to oxidize the sulfur dioxid gas than they would when the electric treatment is applied to the gases at the reduced temperature which prevails after the gases have been cooled in the Glover tower, although if the electric arcs were applied to gas direct from sulfur burners, and if the treated gas were at once discharged into a Glover tower, any oxids of nitrogen formed by the high temperature of the electric arcs would be kept from reverting by the lower temperature of the Glover tower, and by absorption in the sulfuric acid running down the Glover tower in contact with the electrically treated gas.

It is also evident that the treatment by means of electricity could be applied in the interior of the Glover tower with advantageous results as regards temperatures and contact of treated gases with sulfuric acid, or the treatment could be applied at any point in the process subsequent to the Glover tower, as long as sulfur dioxid remains. Even in the Gay Lussac tower, or between the Gay Lussac towers if more than one is used, some of the nitrous compounds present are of such character as to be insoluble or only slowly soluble in sulfuric acid, as for example, the compounds $N_2O$ or $NO$. The subjection of the gas to contact with an electric discharge in or near the Gay Lussac towers after the sulfur dioxid has been almost entirely eliminated would still serve the purpose of oxidizing $NO$ to $NO_2$ or to $N_2O_3$ which are more readily soluble in sulfuric acid and which could then be absorbed and returned to the process in the Glover tower, thus further reducing the consumption of nitric acid or nitrate of soda necessary to maintain the oxidizing condition in the sulfuric acid process. The subjection of the gas at various points to an electric discharge could, therefore, be utilized to regulate or control the sulfuric acid process, for example, if the gaseous mixture delivered by the Glover tower should have passed the first electric discharge without having received sufficient oxidizing reagents, the discovery of such fact by inspection of the gases at a point farther along in their travel would lead to the subjection of said gases to a further or additional electric discharge, and a temporary defective condition could thus readily be corrected or overcome.

In some cases where the temperature of gas before entering the Glover tower is too low for the most efficient operation of the Glover tower, the application of an electric arc would have the further advantage of raising the average temperature of gas entering the Glover tower, thereby increasing the efficiency of same while at the same time conserving the production of oxids of nitrogen.

We claim:

1. In sulfuric acid manufacture, the mode herein described of effecting the conversion of sulfur dioxid into sulfur trioxid, said mode consisting in subjecting the gases containing sulfur dioxid and oxygen after leaving the sulfur dioxid generator and before reaching the lead chamber to the action of an electric discharge.

2. In sulfuric acid manufacture, the mode herein described of effecting the conversion of sulfur dioxid into sulfur trioxid, said mode consisting in subjecting the gases containing sulfur dioxid and oxygen after leaving the Glover tower and before reaching the lead chamber to the action of an electric discharge.

3. In sulfuric acid manufacture, the mode herein described of effecting the conversion of sulfur dioxid into sulfur trioxid, said mode consisting in subjecting the gases containing sulfur dioxid and oxygen at one or more points between the Glover tower and the Gay Lussac tower to the action of an electric discharge.

4. In sulfuric acid manufacture, the mode herein described of preventing reversion of oxids of nitrogen to their elements, said mode consisting in subjecting said oxids immediately after their formation at the high temperature of electric arcs to contact with sulfuric acid at a temperature at which it will absorb the same.

In testimony whereof, we have signed our names to this specification, in the presence of subscribing witnesses.

WILLIAM J. KEE, Jr.
UTLEY WEDGE.

Witnesses to signature of William J. Kee, Jr.:
OTTO RISSMANN,
GEORGE V. LEWIS.

Witnesses to signature of Utley Wedge:
HAMILTON D. TURNER,
KATE A. BEADLE.